US012672058B2

(12) United States Patent
Murugan et al.

(10) Patent No.: US 12,672,058 B2
(45) Date of Patent: Jun. 30, 2026

(54) ADAPTIVE CELL SELECTION, RESELECTION AND MOBILITY ASSISTANCE TECHNIQUES

(71) Applicant: QUALCOMM INCORPORATED, San Diego, CA (US)

(72) Inventors: Muralidharan Murugan, Hyderabad (IN); Rishika Tindola, Hyderabad (IN); Nitin Pant, San Diego, CA (US); Jun Deng, Shanghai (CN); Hewu Gu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 18/550,277

(22) PCT Filed: Apr. 30, 2021

(86) PCT No.: PCT/CN2021/091530
§ 371 (c)(1),
(2) Date: Sep. 12, 2023

(87) PCT Pub. No.: WO2022/227013
PCT Pub. Date: Nov. 3, 2022

(65) Prior Publication Data
US 2024/0187982 A1 Jun. 6, 2024

(51) Int. Cl.
*H04W 48/20* (2009.01)
*H04W 24/10* (2009.01)
*H04W 36/08* (2009.01)

(52) U.S. Cl.
CPC ........... *H04W 48/20* (2013.01); *H04W 24/10* (2013.01); *H04W 36/08* (2013.01)

(58) Field of Classification Search
CPC ... H04W 48/20; H04W 36/04; H04W 36/302; H04W 36/22; H04W 24/08
(Continued)

(56) References Cited

U.S. PATENT DOCUMENTS 5,722,070 A * 2/1998 Alford .................. H04W 48/20
455/425
10,200,930 B2 * 2/2019 Ku ....................... H04W 36/302
(Continued)

FOREIGN PATENT DOCUMENTS

CN 108029049 A * 5/2018 ............ H04W 36/22
CN 108141816 A * 6/2018 ............ H04W 48/08
(Continued)

OTHER PUBLICATIONS

"LTE Cell Camping and Selection Procedure", Anonymous, Jul. 21, 2020 (Year: 2020).*
(Continued)

*Primary Examiner* — William D Cumming
(74) *Attorney, Agent, or Firm* — Holland & Hart LLP

(57) ABSTRACT

Methods, systems, and devices for wireless communication are described that provide for cell selection or reselection at a user equipment (UE) based on cell selection preference criteria of the UE. The UE may receive a set of cell selection criteria that provides a priority order for cell selection based on one or more cell features, cell types, or combinations thereof. The UE, based on one or more signal measurements of available cells and the cell selection criteria, may select one of the available cells for communications. The UE may also maintain a feature cell database in which a number of cells and an associated feature mask may be stored and used to identify cells having features or types associated with the cell selection criteria for use in cell prioritization. Cell selection criteria may be used for cell selection/reselection procedures, mobility procedures, or any combinations thereof.

28 Claims, 15 Drawing Sheets

(58) Field of Classification Search
USPC ................................................. 455/425, 437
See application file for complete search history.

(56) References Cited

U.S. PATENT DOCUMENTS

| | | | | |
|---|---|---|---|---|
| 10,560,869 | B2 * | 2/2020 | Ku | H04W 36/22 |
| 2004/0162074 | A1 * | 8/2004 | Chen | H04W 36/04 |
| | | | | 455/437 |
| 2016/0127956 | A1 | 5/2016 | Jujaray et al. | |
| 2018/0146409 | A1 * | 5/2018 | Ku | H04W 24/08 |
| 2019/0349825 | A1 | 11/2019 | Tseng et al. | |

FOREIGN PATENT DOCUMENTS

| | | |
|---|---|---|
| CN | 109982411 A | 7/2019 |
| CN | 111866964 A | 10/2020 |
| EP | 3346767 A1 * | 7/2018 | ............ H04W 24/08 |
| EP | 3346767 B1 * | 1/2022 | ........ H04W 36/0007 |
| KR | 100639334 B1 | 10/2006 |
| WO | WO-2010049243 A1 | 5/2010 |

OTHER PUBLICATIONS

"A Survey on Handover Management: From LTE to NR", Muhammad Tayyab 1,3, Xavier Gelabert2, and Riku Jäntti, Sep. 6, 2019 (Year: 2019).*

International Search Report and Written Opinion—PCT/CN2021/091530—ISA/EPO—Jan. 25, 2022 (209053WO1).

Panasonic: "UE Preferring CSG Cells", 3GPP Draft, 3GPP TSG-SA1 #46, S1-091078, Chiba, Japan, May 11-15, 2009, 2 Pages.

Supplementary European Search Report—EP21938487—Search Authority—Munich—Jan. 14, 2025 (209053EP).

* cited by examiner

| FPL 230 | FDB 235 |
|---------|---------|

220-a

205

210

225

105-a 110-a

215

220-b 115-a 105-b 110-b

220 — Cell Information (e.g., SIB)

225 — Connection Establishment Request

200

FPL
330

FDB
335

320-a

305

105-c

325

315

310

320-b 110-c 110-d 105-d 115-b

320

325

Ref. Signal

UL Message (based on reselection)

300

420-a

405

410

FPL
430

FDB
435

425

105-e
(RAT-1)

115-c

415

110-e 420-b 110-f 105-f
(RAT-2)

420

425

Cell Information (e.g., SIB)

Measurement Report

400

520-a

FPL 530    FDB 535

505

510

105-g (RAT-1)

Return 110-g    555

Fallback

545

110-h 105-h (RAT-2)

115-d 550    515

520-b

520        Cell Information (e.g., SIB)

500

640

620-a

605

610

625

| FPL 630 | FDB 635 |
| --- | --- |

115-e 105-i
(Source)

615

620-b

Handover

645

105-j
(Target)

620 — Ref. Signal

625 — Measurement Report

640 — Handover Message

600

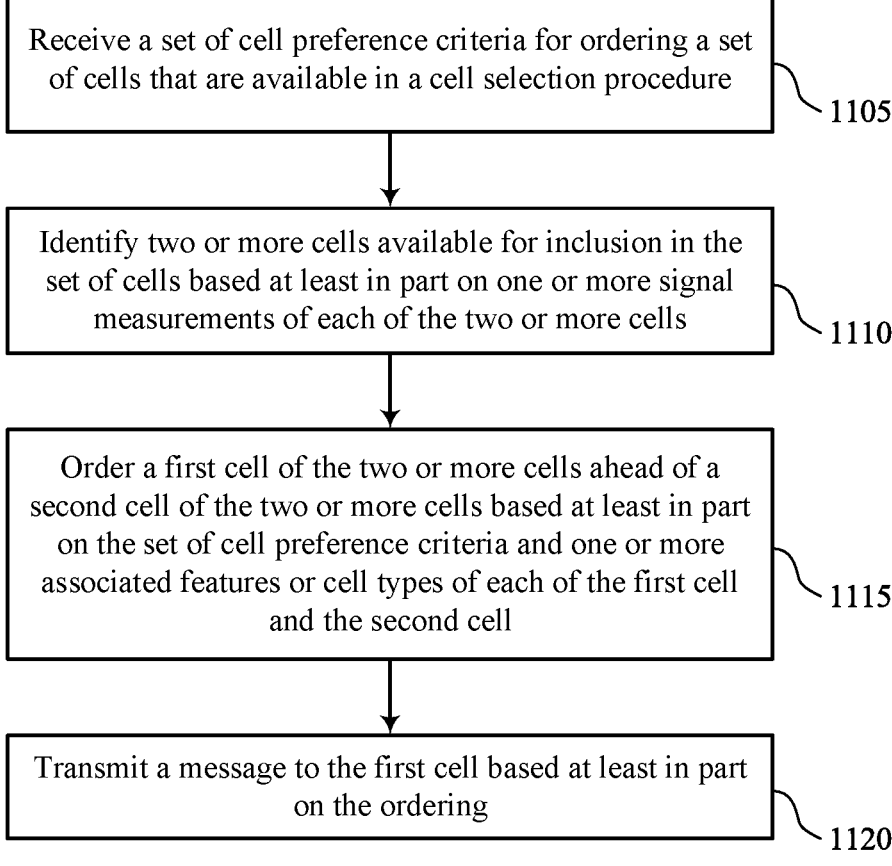

Receive a set of cell preference criteria for ordering a set of cells that are available in a cell selection procedure

1105

Identify two or more cells available for inclusion in the set of cells based at least in part on one or more signal measurements of each of the two or more cells

1110

Order a first cell of the two or more cells ahead of a second cell of the two or more cells based at least in part on the set of cell preference criteria and one or more associated features or cell types of each of the first cell and the second cell

1115

Transmit a message to the first cell based at least in part on the ordering

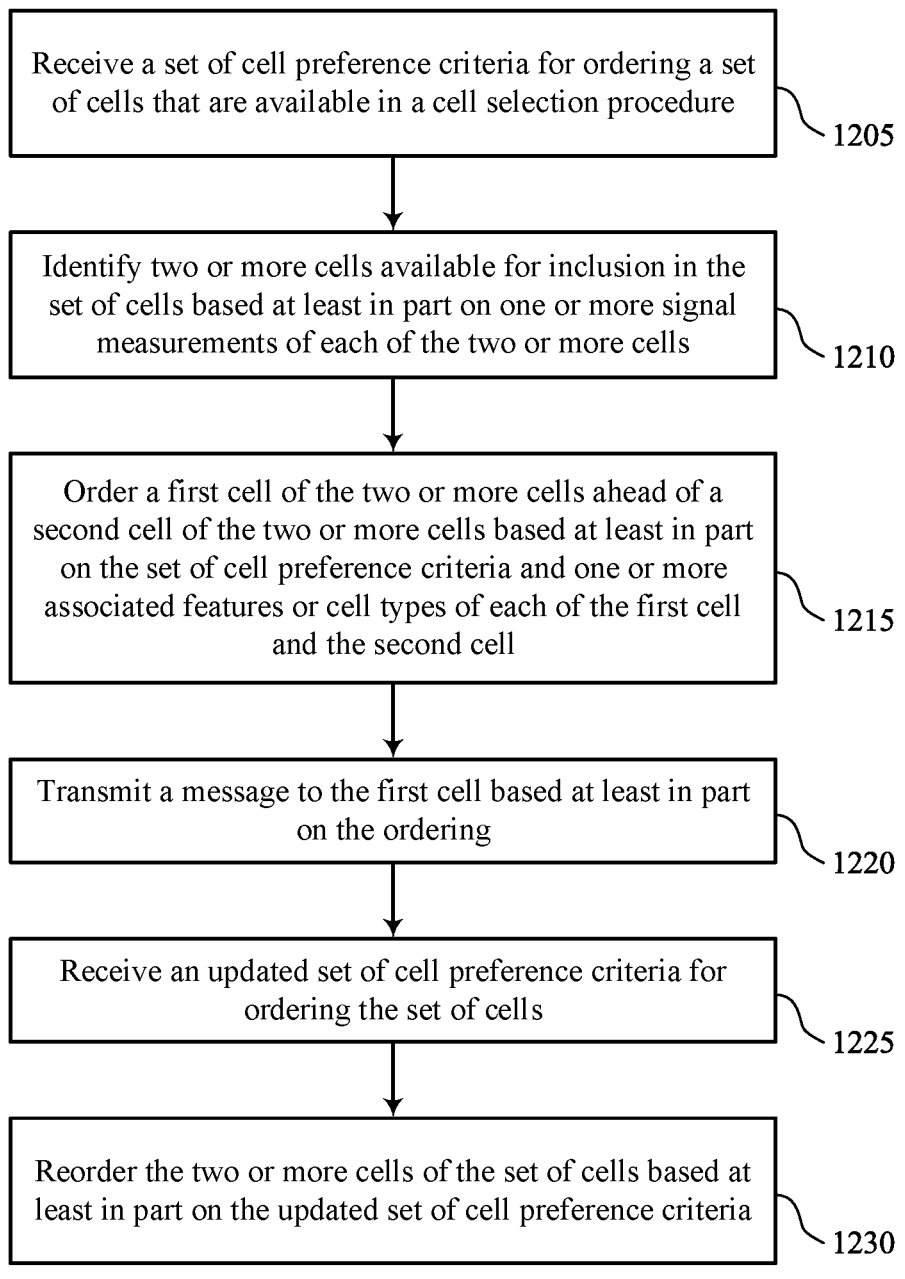

Receive a set of cell preference criteria for ordering a set of cells that are available in a cell selection procedure

1205

Identify two or more cells available for inclusion in the set of cells based at least in part on one or more signal measurements of each of the two or more cells

1210

Order a first cell of the two or more cells ahead of a second cell of the two or more cells based at least in part on the set of cell preference criteria and one or more associated features or cell types of each of the first cell and the second cell

1215

Transmit a message to the first cell based at least in part on the ordering

1220

Receive an updated set of cell preference criteria for ordering the set of cells

1225

Reorder the two or more cells of the set of cells based at least in part on the updated set of cell preference criteria

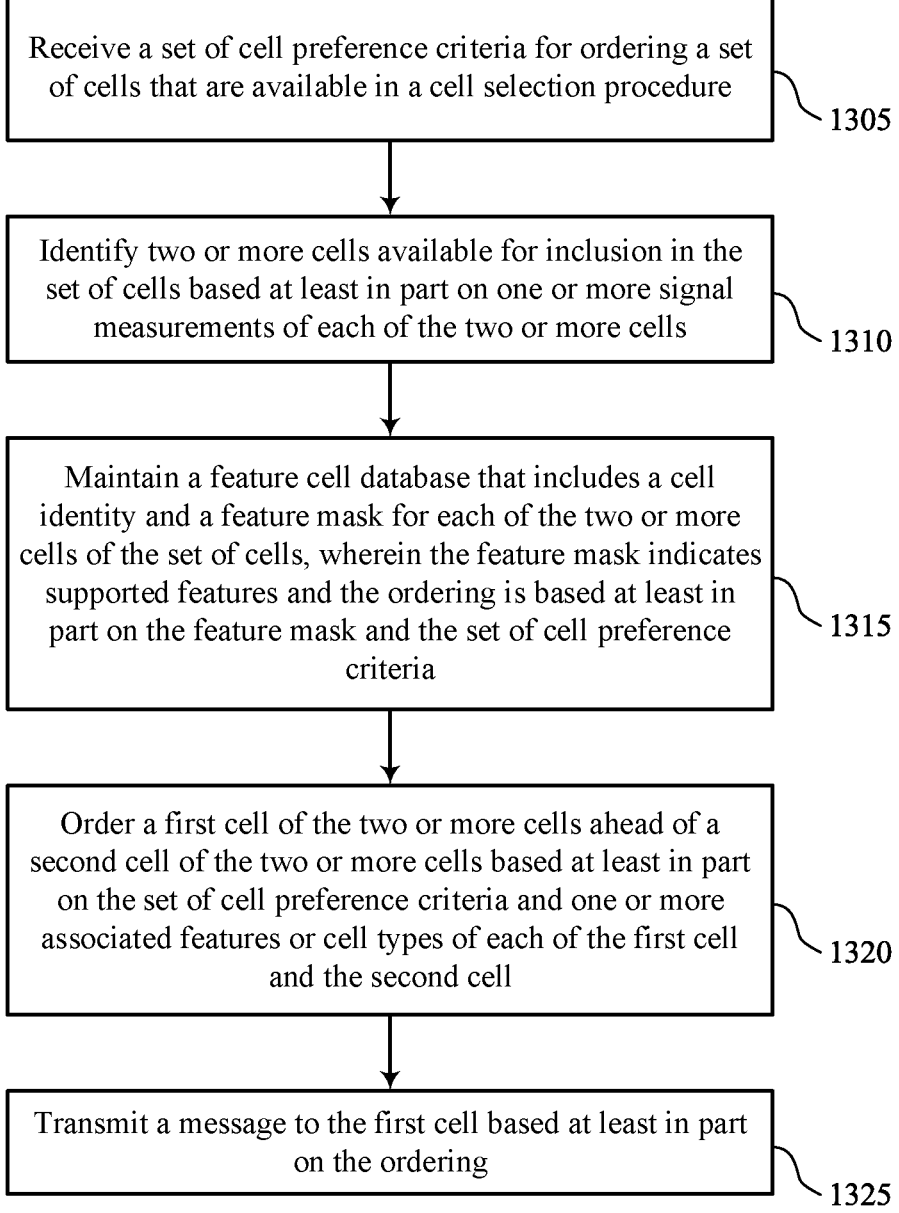

Receive a set of cell preference criteria for ordering a set of cells that are available in a cell selection procedure

1305

Identify two or more cells available for inclusion in the set of cells based at least in part on one or more signal measurements of each of the two or more cells

1310

Maintain a feature cell database that includes a cell identity and a feature mask for each of the two or more cells of the set of cells, wherein the feature mask indicates supported features and the ordering is based at least in part on the feature mask and the set of cell preference criteria

1315

Order a first cell of the two or more cells ahead of a second cell of the two or more cells based at least in part on the set of cell preference criteria and one or more associated features or cell types of each of the first cell and the second cell

1320

Transmit a message to the first cell based at least in part on the ordering

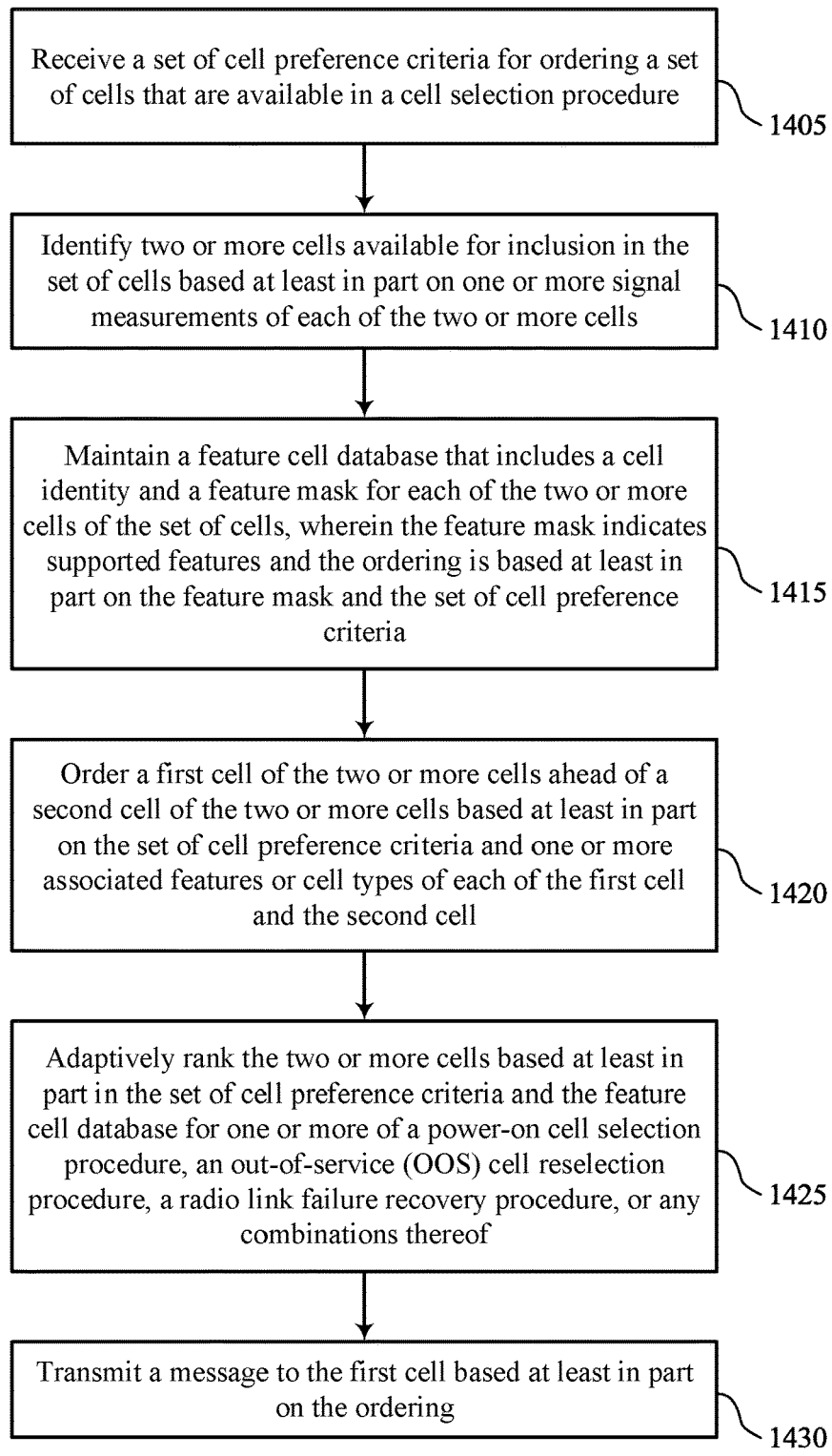

Receive a set of cell preference criteria for ordering a set of cells that are available in a cell selection procedure
1405

Identify two or more cells available for inclusion in the set of cells based at least in part on one or more signal measurements of each of the two or more cells
1410

Maintain a feature cell database that includes a cell identity and a feature mask for each of the two or more cells of the set of cells, wherein the feature mask indicates supported features and the ordering is based at least in part on the feature mask and the set of cell preference criteria
1415

Order a first cell of the two or more cells ahead of a second cell of the two or more cells based at least in part on the set of cell preference criteria and one or more associated features or cell types of each of the first cell and the second cell
1420

Adaptively rank the two or more cells based at least in part in the set of cell preference criteria and the feature cell database for one or more of a power-on cell selection procedure, an out-of-service (OOS) cell reselection procedure, a radio link failure recovery procedure, or any combinations thereof
1425

Transmit a message to the first cell based at least in part on the ordering
1430

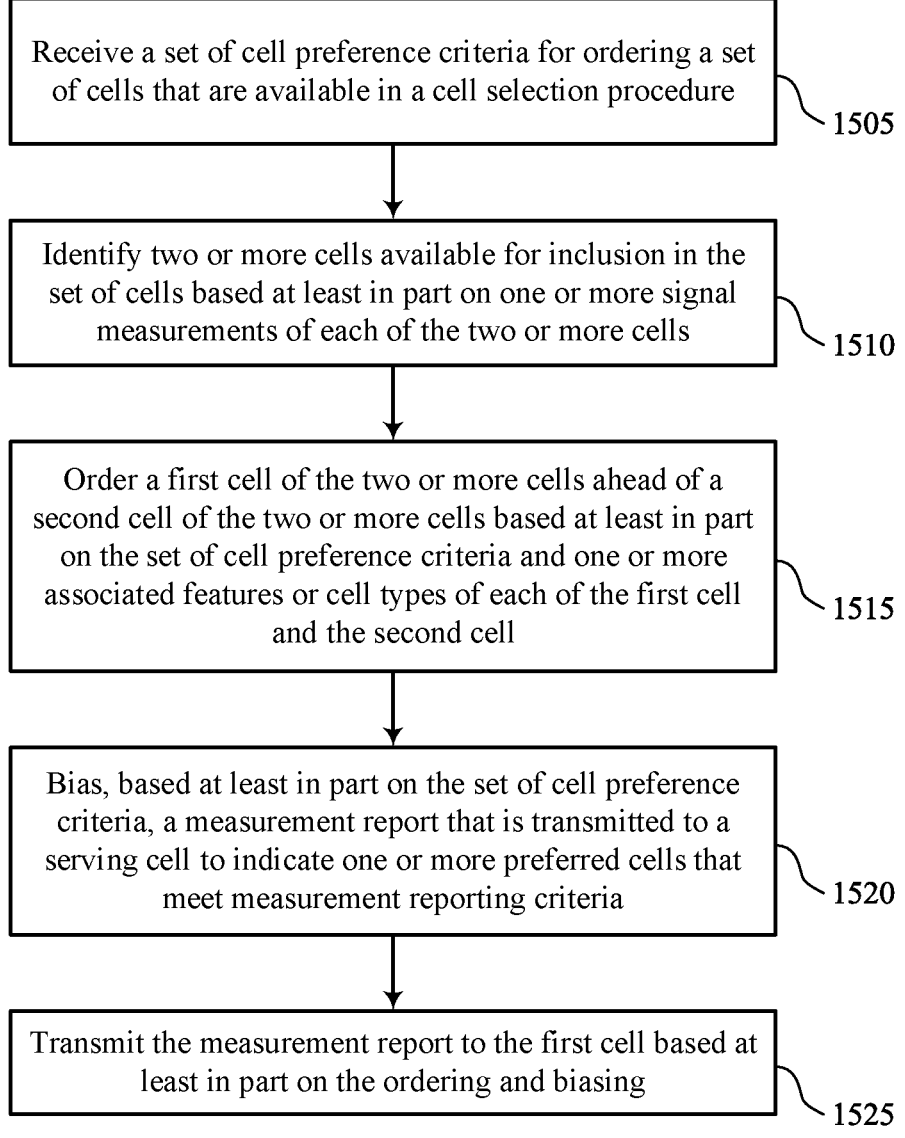

Receive a set of cell preference criteria for ordering a set of cells that are available in a cell selection procedure

1505

Identify two or more cells available for inclusion in the set of cells based at least in part on one or more signal measurements of each of the two or more cells

1510

Order a first cell of the two or more cells ahead of a second cell of the two or more cells based at least in part on the set of cell preference criteria and one or more associated features or cell types of each of the first cell and the second cell

1515

Bias, based at least in part on the set of cell preference criteria, a measurement report that is transmitted to a serving cell to indicate one or more preferred cells that meet measurement reporting criteria

1520

Transmit the measurement report to the first cell based at least in part on the ordering and biasing

ADAPTIVE CELL SELECTION, RESELECTION AND MOBILITY ASSISTANCE TECHNIQUES

CROSS REFERENCE

The present Application is a 371 national stage filing of International PCT Application No. PCT/CN2021/091530 by MURUGAN et al. entitled "ADAPTIVE CELL SELECTION, RESELECTION AND MOBILITY ASSISTANCE TECHNIQUES," filed Apr. 30, 2021, which is assigned to the assignee hereof, and which is expressly incorporated by reference in its entirety herein.

FIELD OF TECHNOLOGY

The following relates to wireless communication, including adaptive cell selection, reselection and mobility assistance techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some deployments, a UE may perform a cell selection procedure at certain instances in which a particular cell (e.g., base station or network access node) is selected for a connection between the UE and a wireless communications system. For example, when the UE powers on from a power-off state, the UE may monitor for signals from a number of available cells and perform the cell selection procedure to select one of the cells and transmit a connection establishment request to the selected cell. Further, such a UE may perform a similar cell selection procedure when transitioning from an out-of-service state to an in-service state or subsequent to a radio link failure (RLF) situation. Efficient cell selection to desirable cells may help to enhance efficiency of the wireless communications system.

SUMMARY

The described techniques relate to improved methods, systems, devices, and apparatuses that support adaptive cell selection, reselection and mobility assistance techniques. In various aspects, techniques provide for cell selection or reselection at a user equipment (UE) based on cell selection preference criteria of the UE. In some cases, the UE may receive a set of cell selection criteria that provides a priority order for cell selection based on one or more cell features, cell types, or combinations thereof. In some cases, the set of cell selection criteria, or updates thereto, may be received in an over-the-air (OTA) wireless modem update that is received from a network entity. The UE, based on one or more signal measurements of available cells and the cell selection criteria, may select one of the available cells and transmit a message (e.g., a connection establishment request) to the selected cell. In some cases, the UE may also maintain a feature cell database in which a number of cells and an associated feature mask may be stored and used to identify cells having the cell features of cell types associated with the cell selection criteria. In some cases, the UE may create and maintain the feature cell database based on cells that are detected by the UE. In other cases, the UE may receive some or all of the entries of the feature cell database from a network entity.

A method for wireless communication at a user equipment (UE) is described. The method may include receiving a set of cell preference criteria for ordering a set of cells that are available in a cell selection procedure, identifying two or more cells available for inclusion in the set of cells based on one or more signal measurements of each of the two or more cells, ordering a first cell of the two or more cells ahead of a second cell of the two or more cells based on the set of cell preference criteria and one or more associated features or cell types of each of the first cell and the second cell, and transmitting a message to the first cell based on the ordering.

An apparatus for wireless communication at a UE is described. The apparatus may include a processor, memory in electronic communication with the processor, and instructions stored in the memory. The instructions may be executable by the processor to cause the apparatus to receive a set of cell preference criteria for ordering a set of cells that are available in a cell selection procedure, identify two or more cells available for inclusion in the set of cells based on one or more signal measurements of each of the two or more cells, order a first cell of the two or more cells ahead of a second cell of the two or more cells based on the set of cell preference criteria and one or more associated features or cell types of each of the first cell and the second cell, and transmit a message to the first cell based on the ordering.

Another apparatus for wireless communication at a UE is described. The apparatus may include means for receiving a set of cell preference criteria for ordering a set of cells that are available in a cell selection procedure, means for identifying two or more cells available for inclusion in the set of cells based on one or more signal measurements of each of the two or more cells, means for ordering a first cell of the two or more cells ahead of a second cell of the two or more cells based on the set of cell preference criteria and one or more associated features or cell types of each of the first cell and the second cell, and means for transmitting a message to the first cell based on the ordering.

A non-transitory computer-readable medium storing code for wireless communication at a UE is described. The code may include instructions executable by a processor to receive a set of cell preference criteria for ordering a set of cells that are available in a cell selection procedure, identify two or more cells available for inclusion in the set of cells based on one or more signal measurements of each of the two or more cells, order a first cell of the two or more cells ahead of a second cell of the two or more cells based on the set of cell preference criteria and one or more associated features or cell types of each of the first cell and the second cell, and transmit a message to the first cell based on the ordering.

Some examples of the method, apparatuses, and non-transitory computer-readable medium described herein may further include operations, features, means, or instructions for receiving an updated set of cell preference criteria for ordering the set of cells and reordering the two or more cells of the set of cells based on the updated set of cell preference criteria. In some examples of the method, apparatuses, and non-transitory computer-readable medium described herein, the set of cell preference criteria may be based on a priority list of one or more features or cell types associated with the set of cells. In some examples of the method, apparatuses, and non-transitory computer-readable medium described herein, the one or more features or cell types include one or more of an enhanced measurement report feature, a throughput capability, a power level, a closed subscriber group cell type, an enhanced multimedia broadcast and multicast service cell type, a cellular vehicle-to-everything cell type, a high speed train cell type, a non-standalone (NSA) cell type, an enhanced coverage level feature, or any combinations thereof. In some examples of the method, apparatuses, and non-transitory computer-readable medium described herein, the set of cell preference criteria may be based on one or more of a carrier preference, an original equipment manufacturer (OEM) preference, a user preference, or any combinations thereof.

In some examples of the method, apparatuses, and non-transitory computer-readable medium described herein, the set of cell preference criteria, and one or more updated sets of cell preference criteria may be received through over-the-air (OTA) wireless modem upgrades received at the UE, a user preference change received at the UE, or any combinations thereof. In some examples of the method, apparatuses, and non-transitory computer-readable medium described herein, the set of cell preference criteria may be extensible for any new feature or cell type that may be defined subsequent to an initial deployment of the UE. In some examples of the method, apparatuses, and non-transitory computer-readable medium described herein, the set of cell preference criteria may be based on a subscription associated with the UE and may be applied across two or more radio access technologies (RATs).

Some examples of the method, apparatuses, and non-transitory computer-readable medium described herein may further include operations, features, means, or instructions for maintaining a feature cell database that includes a cell identity and a feature mask for each of the two or more cells of the set of cells, where the feature mask indicates supported features and the ordering may be based on the feature mask and the set of cell preference criteria. In some examples of the method, apparatuses, and non-transitory computer-readable medium described herein, the supported features of each cell may be determined based on one or more system information blocks received from each cell. In some examples of the method, apparatuses, and non-transitory computer-readable medium described herein, the feature cell database may be accumulated over time by the UE, updated by an original equipment manufacturer (OEM) through a wireless modem interface, updated by a carrier associated with the UE through the wireless modem interface, or any combinations thereof. In some examples of the method, apparatuses, and non-transitory computer-readable medium described herein, the feature cell database includes separate entries for two or more radio access technologies (RATs), one or more entries that may be applied across the two or more radio access technology (RAT)s, or combinations thereof.

In some examples of the method, apparatuses, and non-transitory computer-readable medium described herein, the ordering may include operations, features, means, or instructions for adaptively ranking the two or more cells based at least in part in the set of cell preference criteria and the feature cell database for one or more of a power-on cell selection procedure, an out-of-service (OOS) cell reselection procedure, a radio link failure recovery procedure, or any combinations thereof. In some examples of the method, apparatuses, and non-transitory computer-readable medium described herein, the ordering provides that a more preferred cell may be prioritized for selection by the UE based at least in part in the set of cell preference criteria and the feature cell database.

In some examples of the method, apparatuses, and non-transitory computer-readable medium described herein, a cell reselection procedure may be biased to a preferred cell through ordering an absolute radio frequency channel number or frequency layer of the preferred cell ahead of one or more other absolute radio frequency channel numbers or frequency layers of one or more other cells. In some examples of the method, apparatuses, and non-transitory computer-readable medium described herein, biasing may be based on the set of cell preference criteria, a measurement report that may be transmitted to a serving cell to indicate one or more preferred cells that meet measurement reporting criteria.

In some examples of the method, apparatuses, and non-transitory computer-readable medium described herein, the set of cell preference criteria and a feature cell database may be shared by two or more supported radio access technologies (RATs) to bias inter-RAT mobility toward one or more preferred cells across the two or more supported RATs. In some examples of the method, apparatuses, and non-transitory computer-readable medium described herein, the UE switches from a first RAT to a second RAT of the two or more supported RATs, and where the feature cell database may be used to select a return cell of the first RAT when the UE switches back to the first RAT from the second RAT. In some examples of the method, apparatuses, and non-transitory computer-readable medium described herein, the set of cell preference criteria and a feature cell database may be applied to any RAT over which the UE can communicate with another wireless device, irrespective of whether the RAT may be defined before or after deployment of the UE.

BRIEF DESCRIPTION OF THE DRAWINGS

FIGS. 11 through 15 show flowcharts illustrating methods that support adaptive cell selection, reselection and mobility assistance techniques in accordance with aspects of the present disclosure.

DETAILED DESCRIPTION

Figure 1:
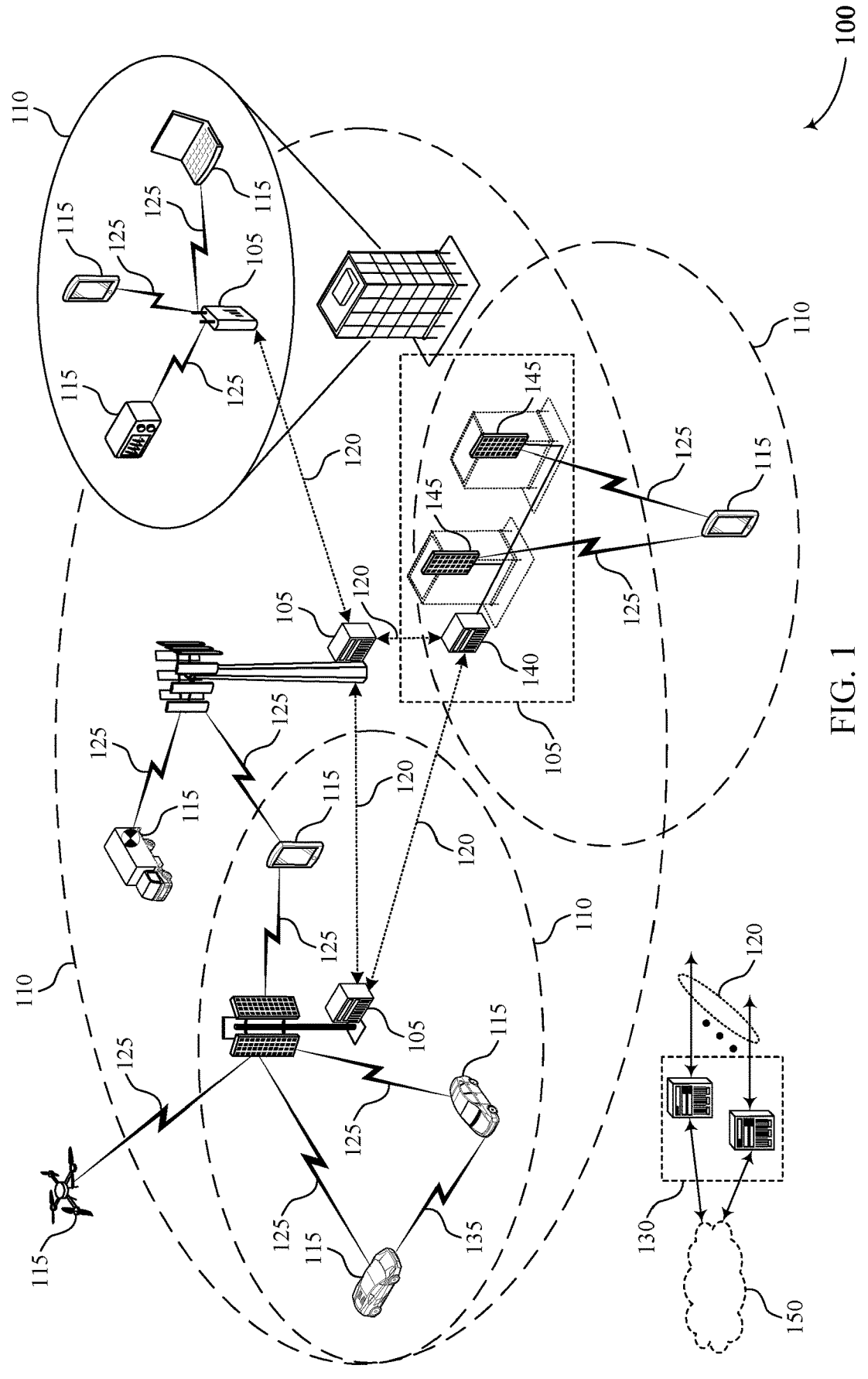
FIG. 1 illustrates an example of a wireless communications system that supports adaptive cell selection, reselection and mobility assistance techniques in accordance with aspects of the present disclosure.

A user equipment (UE) may communicate with a base station which may provide communication coverage with the UE via a cell. In some examples, the UE may select or reselect a cell based on one or more cell preference criteria. Cell selection may involve a UE selecting a cell for a connection establishment when transitioning from a power-off state, an out-of-service (QOS) state, or as part of a radio link failure (RLF) recovery. Reselection may involve the UE ceasing communications with a first cell and/or attempting to initiate communications with a second cell. The UE may perform the reselection, for example, due to the second cell having a higher reselection priority than the first cell or due to a threshold parameter for reselection (e.g., measured signal strength with the first cell or second cell) exceeding a threshold.

In some cases, a UE may perform cell selection or reselection based on signal strength measurements of multiple available cells that are associated with a radio access technology (RAT) that is supported by the UE. However, during cell selection (e.g., for power-on/OOS/RLF recovery, etc.), cell reselection, and connected mode mobility, a preference on which cell of multiple available cells that the UE should camp on may vary depending on the features the cell supports or does not support as well as user, original equipment manufacturer (OEM), or carrier preferences. For example, some operators may desire to prioritize high speed train (HST) cells with non-standalone (NSA) support over non-NSA HST cells. NSA cells may provide user plane communications using 5G NR and control plane communications using an existing 4G LTE network, for example, and non-NSA HST cells may provide both the user plane and control plane using the 4G LTE network. In other cases, in areas where NSA is deployed, operators may desire to prioritize NSA cells over non-NSA cells, and in areas where NSA cells are not available it may be desirable to prioritize cells that have entries stored in an acquisition database (ACQ DB) of the UE over cells that are not present in the ACQ DB. Additionally or alternatively, in some cases a network operator may deploy communications servers within their network and may desire to prioritize cells associated with the servers based on a network frequency list (NFL) database (or customer injected database). Other potential preferences for cell selection may be based on, for example, cells that are closed subscriber group (CSG) cells, cells that support enhanced multimedia broadcast multimedia service (eMBMS), cells that provide coverage enhancement, cells that have relatively large bandwidth, cells that support enhanced discontinuous reception (eDRX), cells that support emergency calls over IP multimedia subsystem (eCallOverIMS), cells that support cellular vehicle-to-everything (CV2X) communications, cells that broadcast one or more system information block (SIBs) such as SIB24 that indicates the cell supports LTE-to-5G reselection, any other features that may be defined in future, or combinations thereof.

Such different potential preferences on cell prioritization may result in different UEs having different preferred cells in different situations. In existing UEs, cell prioritization for cell selection or reselection is performed according to a predefined algorithm of a wireless modem of the UE. Traditionally, such predefined algorithms are not modifiable after UE deployment, and thus cell prioritization for cell selection or reselection is not adaptable once the UE is deployed. In accordance with various techniques provided herein, a UE may be configured for adaptive cell selection based on cell preference criteria, such as based on the region, carrier, OEM or user preferences. Such techniques allow for adaptive cell selection which may be used to address current and future enhancements/operator requirements for the cell selection during power-on/OOS/RLF cases. Techniques as discussed herein may also be used to provide adaptive cell reselection at a UE. Additionally or alternatively, techniques as discussed herein may be used to provide adaptive measurement reporting, in which a UE that is attached on a serving cell may bias a measurement report to provide a higher likelihood that the serving cell initiates a handover of the UE from the serving cell to another cell that is more preferred than other available cells to which the UE could be handed over.

Accordingly, the techniques described herein enable a UE to detect multiple available cells and order detected cells in accordance with a cell selection preference in order to communicate with a first cell of the available cells that is more preferred than other cells of the multiple available cells. Such cell selection preference techniques may be used in cell selection, reselection, or mobility procedures to enhance the likelihood that the UE attaches to a cell that is more preferred for the UE, which may enhance network efficiency and reliability. For example, the UE may be configured to order NSA cells ahead of non-NSA cells, and select an NSA cell for wireless communications even though a non-NSA cell may have marginally better channel metrics that would otherwise indicate that the non-NSA cell should be selected. By selecting the more preferred cell, the UE may connect to a cell with higher bandwidth or enhanced reliability, which may enhance network efficiency and reliability, reduce UE power consumption (e.g., through having fewer cell reselections or handovers, etc.), and enhance user experience, among other advantages, relative to a UE that does not use such adaptive cell selection techniques.

Aspects of the disclosure are initially described in the context of wireless communications systems. Aspects of the disclosure are further illustrated by and described with reference to apparatus diagrams, system diagrams, and flowcharts that relate to adaptive cell selection, reselection and mobility assistance techniques.

FIG. 1 illustrates an example of a wireless communications system 100 that supports adaptive cell selection, reselection and mobility assistance techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more UEs 115 may perform cell selection or reselection based at least in part on cell selection preference criteria. In some cases, a UE 115 may receive a set of cell selection criteria (e.g., from a network entity via an OTA upgrade of a wireless modem at the UE 115) that provides a priority order for cell selection based on one or more cell features, cell types, or combinations thereof. The UE 115, based on one or more signal measurements of available cells and the cell selection criteria, may select one of the available cells and transmit a message (e.g., a connection establishment request) to the selected cell. In some cases, the UE 115 may also maintain a feature cell database (FDB) in which a number of cells and an associated feature mask may be stored and used to identify cells having the cell features of cell types associated with the cell selection criteria. In some cases, the UE 115 may create and maintain the feature cell database based on cells that are detected by the UE 115. In other cases, the UE 115 may receive some or all of the entries of the feature cell database from a network entity. The cell selection preference criteria, the FDB, or both may be used at the UE 115 for cell selection, cell reselection, measurement reporting for mobility procedures (e.g., handover procedures), or any combinations thereof.

Figure 2:
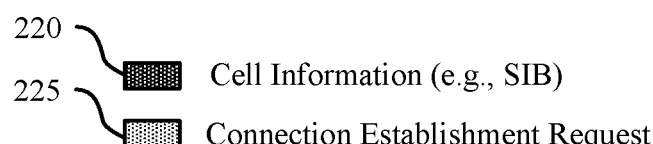
FIGS. 2 through 6 illustrate examples of portions of wireless communications systems that support adaptive cell selection, reselection and mobility assistance techniques in accordance with aspects of the present disclosure.

FIG. 2 illustrates an example of a wireless communications system 200 that supports adaptive cell selection, reselection and mobility assistance techniques in accordance with aspects of the present disclosure. In some examples, wireless communications system 200 may implement aspects of wireless communications system 100. For instance, base stations 105-*a* and 105-*b* may be examples of base stations 105 as described with reference to FIG. 1, coverage areas 110-*a* and 110-*b* may be examples of geographic coverage areas 110 as described with reference to FIG. 1, and UE 115-*a* may be an example of a UE 115 as described with reference to FIG. 1.

UE 115-*a* may be within a first coverage area 110-*a* of a first base station 105-*a* and may also be within a second coverage area 110-*b* of a second base station 105-*b*. The first coverage area 110-*a* of first base station 105-*a* may be associated with a first cell and the second coverage area 110-*b* of second base station 105-*b* may be associated with a second cell. UE 115-*a* may monitor a first downlink carrier 205 of the first base station 105-*a* for first cell information 220-*a*. For example, the UE 115-*a* may monitor for one or more SIBs transmitted by the first base station 105-*a* that indicate a cell type, cell features, or combinations thereof, of the first cell. Likewise, the UE 115-*b* may monitor a second downlink carrier 215 of the second base station 105-*b* for second cell information 220-*b*. The UE 115-*a* may order each of the first cell and the second cell based on cell preference criteria in a FPL 230, and based on the ordering may transmit a connection establishment request 225 via uplink carrier 210 to the first base station 105-*a*. In some cases, the UE 115-*a* may identify that measurements from each of the first cell and the second cell meet channel quality criteria (e.g., a reference signal received power (RSRP) that meets or exceeds a threshold RSRP value), and may order the first cell and the second cell (and other cells having a RSRP that meets the threshold RSRP value) based on the FPL 230.

In some cases, the FPL 230 may provide a list of features or cell types (e.g., CSG, NSA, HST, etc.) that the UE 115-*a* is to use for ordering cells (e.g., in decreasing order of priority). For example, the FPL 230 may include a preferred feature list1={eMBMS, NSA, CSG} that implies the feature priority order of eMBMS>NSA>CSG. Thus, for each cell that meets the measurement threshold RSRP value, the cell features from the FPL may be used to determine a relative priority order for each cell. In the event that two or more cells have a same order according to the FPL, such cells may be ordered based on a RSRP value, for example. A cell feature can refer to any functionality, defined feature, or priority item for the UE 115-*a*. For example, electromagnetic radiation (EMR) levels, estimated throughput, transmission power, CSG, eMBMS, CV2X, HST, NSA, enhanced coverage, EUTRAN-NR dual connectivity (ENDC) capability, or any combinations thereof, could be classified as features. In some cases, the FPL 230 may be based at least in part on carrier, OEM, or user preference, or combinations thereof. In some cases, the FPL 230 may be updated through OTA upgrades or user preference changes. Further, the FPL 230 may be subscription based and shared across different RATs (e.g., shared across 2G/3G/4G/5G RATs, or any other RAT). In some cases, cell types, such as CSG cell type, or any other cell type, may be treated as a feature and included in FPL.

In some cases, in order to allow the UE 115-*a* to identify attributes associated with a cell without having to wait for multiple SIBs to be received and decoded, the UE 115-*a* may maintain a FDB 235. The FDB 235 may include, for example, cell global identifier (CGI), EARFCN, PCID, or combinations thereof, and a feature mask that indicates all supported features on the cell. The supported features in the cell may be determined based on SIBs (e.g., a cell that supports NSA might include upperLayerIndication IE in SIB2 or a cell capable of eMBMS would schedule SIB13 in SIB1). When the UE 115-*a* receives and decodes a SIB from a cell it may add one or more features to the feature mask associated with the cell. In some cases, the FDB 235 may be built over time by the UE 115-*a*. Additionally or alternatively, the FDB 235 may be updated by the OEM or carrier through a secure modem software interface based on known deployment information. The FDB 235 may be a standalone database, or may be integrated with another existing database like an ACQ DB. The FDB 235 may be maintained separately for each RAT, and may or may not be subscription based.

In some cases, during cell selection for power-on/OOS/RLF recovery, the UE 115-*a* may adaptively rank cells based on preferred features from FPL 230 that they support as indicated by the FDB 235, and the UE 115-*a* may prioritize selecting a preferred cell during system scan or ACQ DB scan. Further, during idle mode measurements, reselection can be biased to a preferred cell as long as the cell satisfies reselection criteria. For example, a reselection priority of the EARFCN or frequency layer on which preferred cell is located can be bumped up, or a cell or frequency offset can be used to prioritize preferred cells or deprioritize less-preferred cells. Based on the FPL, the UE 115-*a* may determine its cell selection/RLF recovery algorithm dynamically.

For example, in a high speed train case where NSA is also deployed, a network operator may prioritize HST NSA cells for cell selection/power-on/OOS/RLF case, and FPL values may be as given below in Table 1. In such a case, the order of scan during a cell selection or RLF recovery procedure may be: (1) HST(ENDC); (2) HST(non-ENDC); (3) ENDC; (4) NFL; (5) ACQ DB.

TABLE 1

| Index | FPL entries |
| --- | --- |
| 0 (Highest priority) | HST ENDC |
| 1 | HST non-ENDC |
| 2 | ENDC |
| 3 | Customer injected database (NFL) |
| 4 (Lowest priority) | Other ACQ DB |

In another example, a network operator having an area or region where NSA is deployed and where high speed UEs are not expected (e.g., cells in the area do not include any that are configured as HST cells) may desire to prioritize NSA cells for cell selection/power-on/OOS/RLF cases. Such an operator may thus bias NSA-capable UEs to select NSA cells over non-NSA cells, and FPL values may be as given below in Table 2. In such a case, the order of scan during a cell selection or RLF recovery procedure may be: (1) ENDC; (2) NFL; (3) ACQ DB; (4) inter-frequency neighbor database.

TABLE 2

| Index | FPL entries |
|-------|-------------|
| 0 | ENDC |
| 1 | NFL |
| 2 | ACQ DB |
| 3 | Inter frequency Neighbor database |

Using such techniques, the UE 115-*a* may use the cell selection preference criteria provided in the FPL 230 to adaptively prioritize different features or cell types for different regions, different OEMs, different operators, or any combinations thereof. Further, such techniques may also allow for prioritization of multiple features. Further, the prioritization of cell features or cell types (e.g., cells that support features in which the UE 115-*a* is interested) may be extended to include cell reselection (e.g., idle mode mobility) as discussed with reference to FIG. 3, for inter-RAT (IRAT) mobility cases as discussed with reference to FIG. 4, circuit switched (CS) or evolved packet system (EPS) fallback cases where UE 115-*a* may fallback to a different RAT for a particular service (e.g., for a voice call), and then perform a relatively fast return to the preferred RAT for other services (e.g., eMBB) as discussed with reference to FIG. 5, and/or connected mode measurement reporting as discussed with reference to FIG. 6. Techniques as discussed herein may be easily scalable to support any future feature that might be preferred by an operator, OEM, or user. Further, techniques discussed herein are not RAT specific and can be applied to 2G/3G/4G/5G or any RAT of the future.

Figure 3:
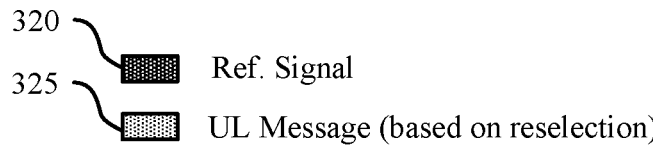

FIG. 3 illustrates an example of a wireless communications system 300 that supports adaptive cell reselection techniques in accordance with aspects of the present disclosure. In some examples, wireless communications system 300 may implement aspects of wireless communications systems 100 or 200. For instance, base stations 105-*c* and 105-*d* may be examples of base stations 105 as described with reference to FIG. 1 or 2, and UE 115-*b* may be an example of a UE 115 as described with reference to FIG. 1 or 2.

Similarly as discussed with reference to FIG. 2, the UE 115-*b* may be within a first coverage area 110-*c* of a first base station 105-*c* and may also be within a second coverage area 110-*d* of a second base station 105-*d*. The first coverage area 110-*c* of first base station 105-*c* may be associated with a first cell and the second coverage area 110-*d* of second base station 105-*d* may be associated with a second cell. UE 115-*b* may monitor a first downlink carrier 305 of the first base station 105-*c* for first reference signal 320-*a* transmissions, and may monitor a second downlink carrier 310 of the second base station 105-*d* for second reference signal 320-*b* transmissions. The UE 115-*b* may include a FPL 330 and a FDB 335, similarly as discussed with reference to FIG. 2.

In cases where techniques as discussed herein are applied in cell reselection at the UE 115-*b* (e.g., cell reselection in idle mode), the FPL entries may use the same FPL as in cell selection or RLF recovery (e.g., FPL 230 as discussed with reference to FIG. 2), or may use a different FPL. Based on the FPL 330, the UE 115-*b* may decide its cell reselection algorithm and may prioritize the cells for the reselection based on the FPL 330. For example, for a high speed train deployment where NSA is also deployed, the UE 115-*b* may use any reselection algorithm and give weights to cells based on the FPL 330. In such a case, the reselection algorithm may provide a reselection priority in accordance with FPL values as below in Table 3, which may set HST ENDC capable cells as a highest priority so that the UE 115-*b* may have a higher likelihood to reselect on such cells. In other cases, the reselection algorithm may apply a penalty to a service of a cell if the particular cell belongs to a lower priority database, which may provide the UE 115-*b* with a higher likelihood to reselect on higher priority database cell. In other cases, the reselection algorithm may apply an offset on the RSRP results for higher priority database candidates, which may provide the UE 115-*b* with a higher likelihood to reselect on higher priority database cell.

TABLE 3

| Index | FPL entries |
|-------|-------------|
| 0 | HST ENDC Database |
| 1 | HST non-ENDC database |
| 2 | ENDC database |
| 3 | Customer injected database (NFL) |
| 4 | ACQ Database |

In this example, the UE 115-*b* may initially establish a connection with first base station 105-*c*, and then move into an idle mode. Based on the FPL 330 and one or more idle mode measurements, such as measurements of reference signals 320, the UE 115-*b* may determine to trigger cell reselection and perform subsequent communications with the second base station 105-*d*. Subsequent to the reselection, the UE 115-*b* may transmit one or more uplink messages 325 to the second base station 105-*d* based on the reselection (e.g., based on a paging message or tracking area update procedure associated with the reselection).

Figure 4:
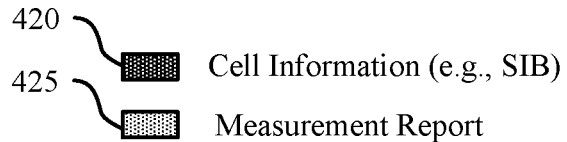
Figure 4:

FIG. 4 illustrates an example of a wireless communications system 400 that supports adaptive inter-RAT (IRAT) mobility techniques in accordance with aspects of the present disclosure. In some examples, wireless communications system 400 may implement aspects of wireless communications systems 100 through 300. For instance, base stations 105-*e* and 105-*f* may be examples of base stations 105 as described with reference to FIGS. 1-3, and UE 115-*c* may be an example of a UE 115 as described with reference to FIGS. 1-3.

Similarly as discussed with reference to FIGS. 2 and 3, the UE 115-*c* may be within a first coverage area 110-*e* of a first base station 105-*e* that communicates using a first RAT (e.g., a NR RAT) and may also be within a second coverage area 110-*f* of a second base station 105-*f* that communicates using a second RAT (e.g., a LTE RAT). The first coverage area 110-*e* of first base station 105-*e* may be associated with a first cell and the second coverage area 110-*f* of second base station 105-*f* may be associated with a second cell. UE 115-*c* may monitor a first downlink carrier 405 of the first base station 105-*e* for first cell information 420-*a* (e.g., in one or more SIBs), and may monitor a second downlink carrier 415 of the second base station 105-*f* for second cell information 420-*b*. The UE 115-*c* may include a FPL 430 and a FDB 435, similarly as discussed with reference to FIGS. 2-3. In this example, the FPL 430 and FDB 435 may be shared by all supported RATs in the UE 115-*c*, and may act to bias inter-RAT (IRAT) mobility toward preferred cells across RATs (e.g., LTE, WCDMA, NR-5G, GSM, etc.). For example, if the UE 115-*c* is performing LTE-to-NR idle mode measurements, and if ims-Emergency Support is part of the FPL 430, the LTE RAT of the second cell can refer to NR aspects of the FDB 435 to prioritize preferred NR cells that have ims-Emergency Support for cell reselection from LTE. In other examples, if the UE 115-*c* is performing NR-to-LTE connected mode measurements, and if eMBMS is part of the FPL 430, the NR RAT can refer to LTE aspects of the FDB 435 and prioritize including preferred LTE cells that support eMBMS in a measurement report 425 transmitted via uplink carrier 410 to the first base station 105-*e*, so that handover or redirection could be triggered to a preferred cell. Additionally or alternatively, for fallback cases (e.g., CS fallback or EMD fallback), such as illustrated in FIG. 5.

Figure 5:

FIG. 5 illustrates an example of a wireless communications system 500 that supports adaptive cell selection, reselection and mobility assistance techniques for fallback cases in accordance with aspects of the present disclosure. In some examples, wireless communications system 500 may implement aspects of wireless communications systems 100 through 400. For instance, base stations 105-*g* and 105-*h* may be examples of base stations 105 as described with reference to FIGS. 1-4, and UE 115-*d* may be an example of a UE 115 as described with reference to FIGS. 1-4.

Similarly as discussed with reference to FIGS. 2 through 4, the UE 115-*d* may be within a first coverage area 110-*g* of a first base station 105-*g* that communicates using a first RAT (e.g., a NR RAT) and may also be within a second coverage area 110-*h* of a second base station 105-*h* that communicates using a second RAT (e.g., a LTE RAT). The first coverage area 110-*g* of first base station 105-*g* may be associated with a first cell and the second coverage area 110-*h* of second base station 105-*h* may be associated with a second cell. UE 115-*d* may monitor a first downlink carrier 505 of the first base station 105-*g* for first cell information 520-*a* (e.g., in one or more SIBs), and may monitor a second downlink carrier 515 of the second base station 105-*h* for second cell information 520-*b*. The UE 115-*d* may include a FPL 530 and a FDB 535, similarly as discussed above. In this example, the FPL 530 and FDB 535 may be shared by all supported RATs in the UE 115-*d*, may use the FDB 535 to select a preferred cell. For example, if the UE 115-*d* communicates using uplink carrier 510 on the first cell (e.g., NR cell) and moves to LTE carrier 550 on the second cell for EPS fallback 545, UE 115-*d* may choose a preferred NR cell from FDB 535 for a relatively fast return 555.

Figure 6:
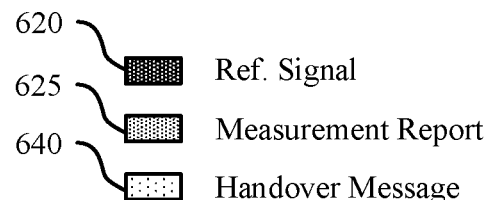

FIG. 6 illustrates an example of a wireless communications system 600 that supports adaptive cell selection, reselection and mobility assistance techniques to bias handovers in accordance with aspects of the present disclosure. In some examples, wireless communications system 400 may implement aspects of wireless communications systems 100 through 300. For instance, base stations 105-*e* and 105-*f* may be examples of base stations 105 as described with reference to FIGS. 1-5, and UE 115-*e* may be an example of a UE 115 as described with reference to FIGS. 1-5.

In this example, the UE 115-*e* may communicate with a first cell of the first base station 105-*i* via downlink channel 605 and uplink channel 610. The UE 115-*e* may measure one or more reference signals 620 from the first base station 105-*i* and the second base station 105-*j*, and may transmit a measurement report 625 to the first base station 105-*i*. Based on the measurement report 625, the first base station 105-*i* may determine to handover the UE 115-*e* to the second base station 105-*j*, and transmit a handover message 640 to initiate the handover 645. In some cases, the UE 115-*e* may use FPL 630 and FDB 635 to order one or more cells according to a cell preference of potential handover targets.

In some cases, during connected mode measurement reporting, the UE 115-*e* may bias the measurement report 625 to include preferred cells determined based on the FPL 630 and FDB 635, as long as the preferred cell meets the measurement reporting criteria (e.g., that have a RSRP that is above a threshold value). For example, a frequency (e.g., F1) may have three cells, Cell A, Cell B and Cell C, in which cell A supports eMBMS; cell B does not support eMBMS support but is a high bandwidth cell; and cell C does not support eMBMS support and is not a high bandwidth cell. Assuming that each of these three cells satisfy the measurement reporting criteria, the UE 115-*e* may only include cell A (e.g., listed first) and cell B (e.g., listed second) in the measurement report, in accordance with FPL entries listed in Table 4. In this way, the UE 115-*e* may prioritize including preferred cells in the measurement report 625 so that connected mode mobility/handover or network triggered redirection happens to a preferred cell. In some cases, such techniques may be used for IRAT measurement reporting as well biasing the reporting to include preferred cells for IRAT handover or IRAT redirection cases.

TABLE 4

| Index | FPL entries |
|-------|-------------|
| 0 | eMBMS |
| 1 | Higher BW cell |
| 2 | CSG |
| 3 | CV2X |
| 4 | ACQ Database |

Figure 7:
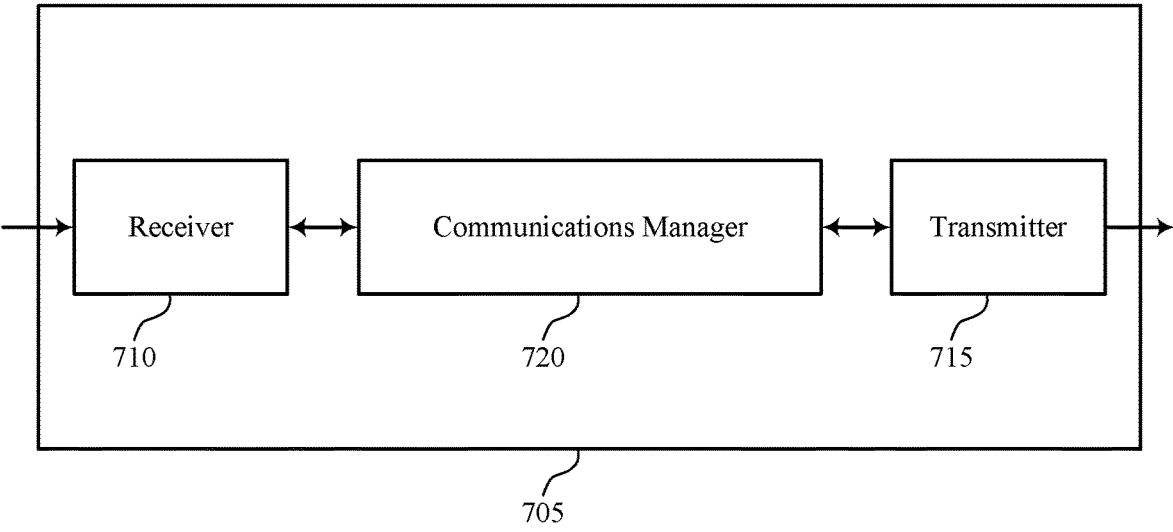
FIGS. 7 and 8 show block diagrams of devices that support adaptive cell selection, reselection and mobility assistance techniques in accordance with aspects of the present disclosure.

FIG. 7 shows a block diagram 700 of a device 705 that supports adaptive cell selection, reselection and mobility assistance techniques in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to adaptive cell selection, reselection and mobility assistance techniques). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to adaptive cell selection, reselection and mobility assistance techniques). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of adaptive cell selection, reselection and mobility assistance techniques as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving a set of cell preference criteria for ordering a set of cells that are available in a cell selection procedure. The communications manager 720 may be configured as or otherwise support a means for identifying two or more cells available for inclusion in the set of cells based on one or more signal measurements of each of the two or more cells. The communications manager 720 may be configured as or otherwise support a means for ordering a first cell of the two or more cells ahead of a second cell of the two or more cells based on the set of cell preference criteria and one or more associated features or cell types of each of the first cell and the second cell. The communications manager 720 may be configured as or otherwise support a means for transmitting a message to the first cell based on the ordering.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for cell prioritization in cell selection, reselection, and handover. Such techniques enhance the efficiency and reliability of the network through selection of preferred cells at a UE. Further, cell preference priorities may be updated at a wireless modem of the UE through OTA updates, which may allow flexibility to adjust cell prioritization as needed by an operator, OEM, or user.

Figure 8:
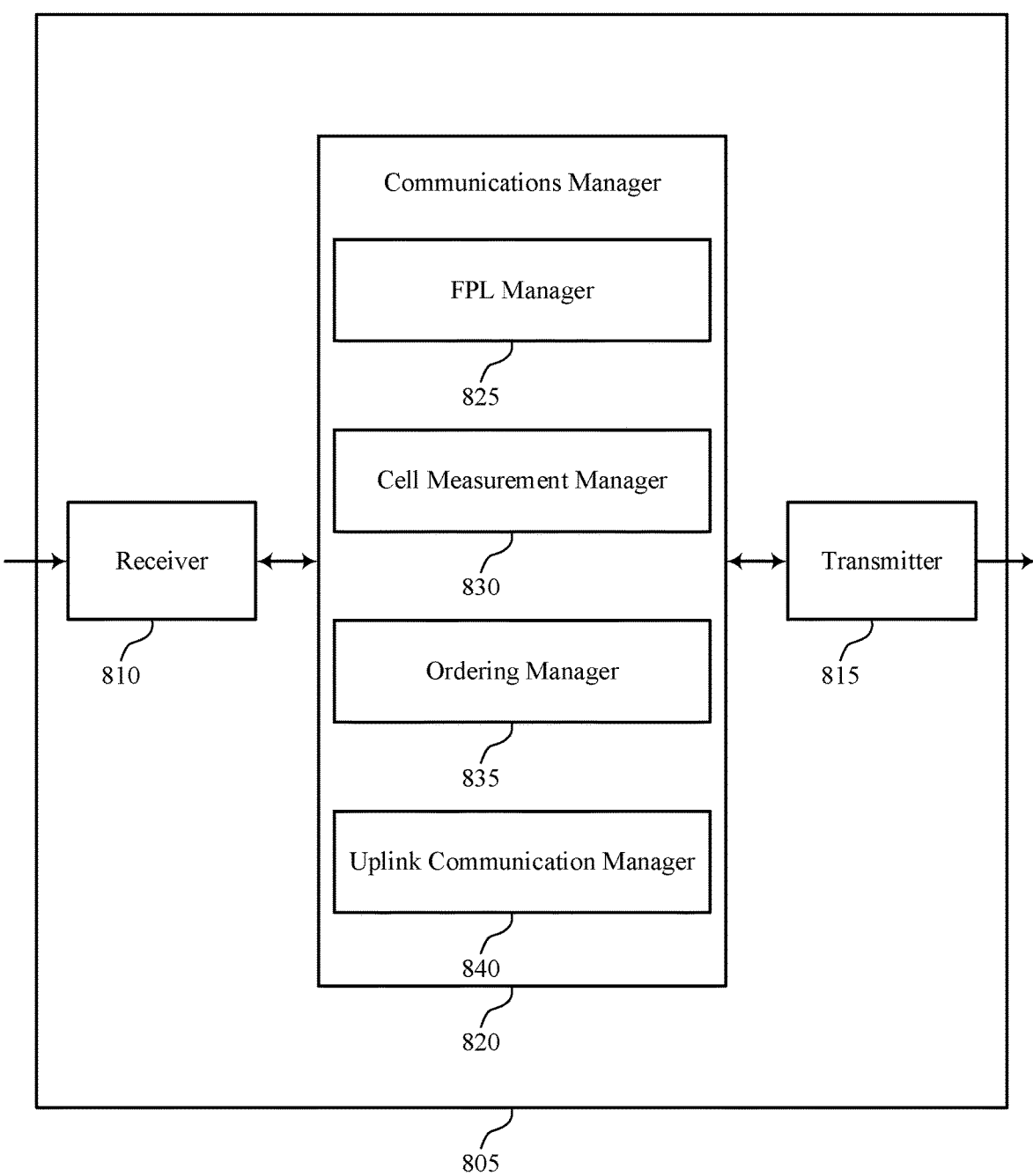

FIG. 8 shows a block diagram 800 of a device 805 that supports adaptive cell selection, reselection and mobility assistance techniques in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to adaptive cell selection, reselection and mobility assistance techniques). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to adaptive cell selection, reselection and mobility assistance techniques). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of adaptive cell selection, reselection and mobility assistance techniques as described herein. For example, the communications manager 820 may include an FPL manager 825, a cell measurement manager 830, an ordering manager 835, an uplink communication manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The FPL manager 825 may be configured as or otherwise support a means for receiving a set of cell preference criteria for ordering a set of cells that are available in a cell selection procedure. The cell measurement manager 830 may be configured as or otherwise support a means for identifying two or more cells available for inclusion in the set of cells based on one or more signal measurements of each of the two or more cells. The ordering manager 835 may be configured as or otherwise support a means for ordering a first cell of the two or more cells ahead of a second cell of the two or more cells based on the set of cell preference criteria and one or more associated features or cell types of each of the first cell and the second cell. The uplink communication manager 840 may be configured as or otherwise support a means for transmitting a message to the first cell based on the ordering.

Figure 9:
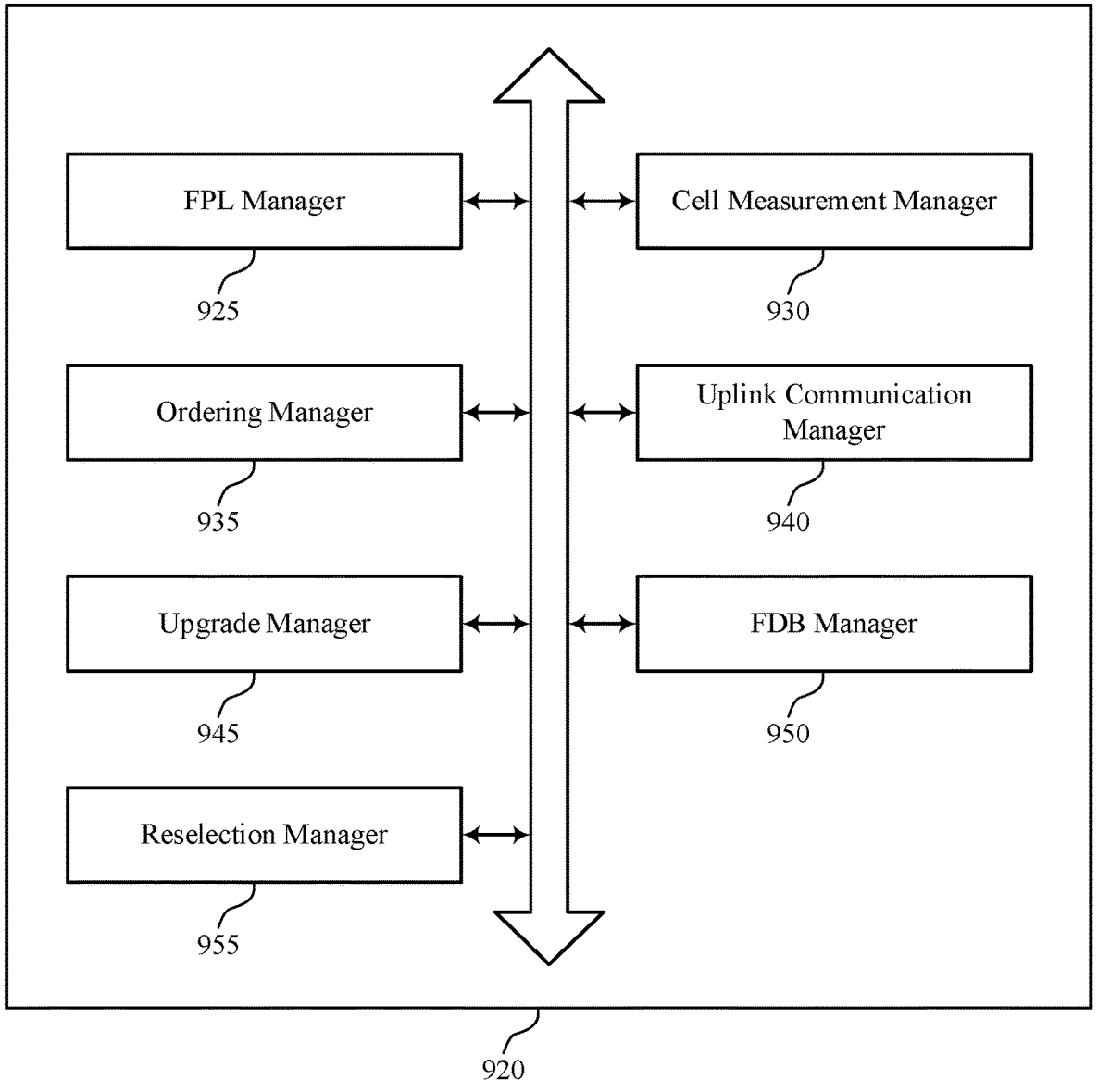
FIG. 9 shows a block diagram of a communications manager that supports adaptive cell selection, reselection and mobility assistance techniques in accordance with aspects of the present disclosure.

FIG. 9 shows a block diagram 900 of a communications manager 920 that supports adaptive cell selection, reselection and mobility assistance techniques in accordance with aspects of the present disclosure. The communications manager 920 may be an example of aspects of a communications manager 720, a communications manager 820, or both, as described herein. The communications manager 920, or various components thereof, may be an example of means for performing various aspects of adaptive cell selection, reselection and mobility assistance techniques as described herein. For example, the communications manager 920 may include an FPL manager 925, a cell measurement manager 930, an ordering manager 935, an uplink communication manager 940, an upgrade manager 945, an FDB manager 950, a reselection manager 955, or any combination thereof. Each of these components may communicate, directly or indirectly, with one another (e.g., via one or more buses).

The communications manager 920 may support wireless communication at a UE in accordance with examples as disclosed herein. The FPL manager 925 may be configured as or otherwise support a means for receiving a set of cell preference criteria for ordering a set of cells that are available in a cell selection procedure. The cell measurement manager 930 may be configured as or otherwise support a means for identifying two or more cells available for inclusion in the set of cells based on one or more signal measurements of each of the two or more cells. The ordering manager 935 may be configured as or otherwise support a means for ordering a first cell of the two or more cells ahead of a second cell of the two or more cells based on the set of cell preference criteria and one or more associated features or cell types of each of the first cell and the second cell. The uplink communication manager 940 may be configured as or otherwise support a means for transmitting a message to the first cell based on the ordering.

In some examples, the FPL manager 925 may be configured as or otherwise support a means for receiving an updated set of cell preference criteria for ordering the set of cells. In some examples, the ordering manager 935 may be configured as or otherwise support a means for reordering the two or more cells of the set of cells based on the updated set of cell preference criteria.

In some examples, the set of cell preference criteria is based on a priority list of one or more features or cell types associated with the set of cells.

In some examples, the one or more features or cell types include one or more of an enhanced measurement report feature, a throughput capability, a power level, a closed subscriber group cell type, an enhanced multimedia broadcast and multicast service cell type, a cellular vehicle-to-everything cell type, a high speed train cell type, a non-standalone (NSA) cell type, an enhanced coverage level feature, or any combinations thereof.

In some examples, the set of cell preference criteria is based on one or more of a carrier preference, an original equipment manufacturer (OEM) preference, a user preference, or any combinations thereof. In some examples, the set of cell preference criteria, and one or more updated sets of cell preference criteria are received through over-the-air (OTA) wireless modem upgrades received at the UE, a user preference change received at the UE, or any combinations thereof. In some examples, the set of cell preference criteria is extensible for any new feature or cell type that is defined subsequent to an initial deployment of the UE. In some examples, the set of cell preference criteria is based on a subscription associated with the UE and is applied across two or more radio access technologies (RATs).

In some examples, the FDB manager 950 may be configured as or otherwise support a means for maintaining a feature cell database that includes a cell identity and a feature mask for each of the two or more cells of the set of cells, where the feature mask indicates supported features and the ordering is based on the feature mask and the set of cell preference criteria. In some examples, the supported features of each cell are determined based on one or more system information blocks received from each cell. In some examples, the feature cell database is accumulated over time by the UE, updated by an original equipment manufacturer (OEM) through a wireless modem interface, updated by a carrier associated with the UE through the wireless modem interface, or any combinations thereof. In some examples, the feature cell database includes separate entries for two or more radio access technologies (RATs), one or more entries that are applied across the two or more RATs, or combinations thereof.

In some examples, to support ordering, the ordering manager 935 may be configured as or otherwise support a means for adaptively ranking the two or more cells based at least in part in the set of cell preference criteria and the feature cell database for one or more of a power-on cell selection procedure, an out-of-service (OOS) cell reselection procedure, a radio link failure recovery procedure, or any combinations thereof. In some examples, the ordering provides that a more preferred cell is prioritized for selection by the UE based at least in part in the set of cell preference criteria and the feature cell database. In some examples, a cell reselection procedure is biased to a preferred cell through ordering an absolute radio frequency channel number or frequency layer of the preferred cell ahead of one or more other absolute radio frequency channel numbers or frequency layers of one or more other cells.

In some examples, the cell measurement manager 930 may be configured as or otherwise support a means for biasing, based on the set of cell preference criteria, a measurement report that is transmitted to a serving cell to indicate one or more preferred cells that meet measurement reporting criteria. In some examples, the set of cell preference criteria and a feature cell database are shared by two or more supported radio access technologies (RATs) to bias inter-RAT mobility toward one or more preferred cells across the two or more supported RATs. In some examples, the UE switches from a first RAT to a second RAT of the two or more supported RATs, and where the feature cell database is used to select a return cell of the first RAT when the UE switches back to the first RAT from the second RAT. In some examples, the set of cell preference criteria and a feature cell database is applied to any RAT over which the UE can communicate with another wireless device, irrespective of whether the RAT is defined before or after deployment of the UE.

Figure 10:
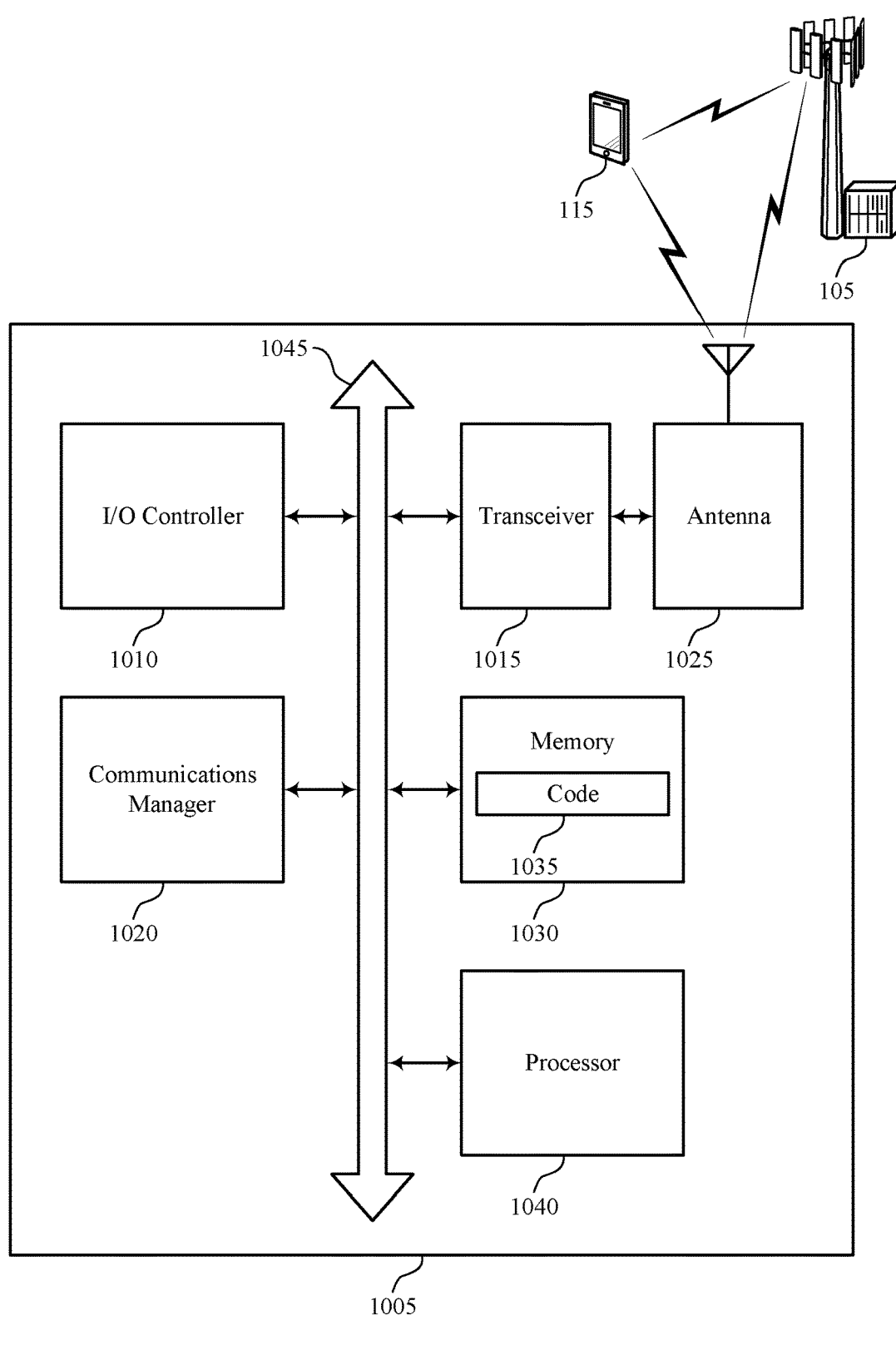
FIG. 10 shows a diagram of a system including a device that supports adaptive cell selection, reselection and mobility assistance techniques in accordance with aspects of the present disclosure.

FIG. 10 shows a diagram of a system 1000 including a device 1005 that supports adaptive cell selection, reselection and mobility assistance techniques in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting adaptive cell selection, reselection and mobility assistance techniques). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving a set of cell preference criteria for ordering a set of cells that are available in a cell selection procedure. The communications manager 1020 may be configured as or otherwise support a means for identifying two or more cells available for inclusion in the set of cells based on one or more signal measurements of each of the two or more cells. The communications manager 1020 may be configured as or otherwise support a means for ordering a first cell of the two or more cells ahead of a second cell of the two or more cells based on the set of cell preference criteria and one or more associated features or cell types of each of the first cell and the second cell. The communications manager 1020 may be configured as or otherwise support a means for transmitting a message to the first cell based on the ordering.

By including or configuring the communications manager 1020 in accordance with examples as described herein, the device 1005 may support techniques for cell prioritization in cell selection, reselection, and handover. Such techniques enhance the efficiency and reliability of the network through selection of preferred cells at a UE. Further, cell preference priorities may be updated at a wireless modem of the UE through OTA updates, which may allow flexibility to adjust cell prioritization as needed by an operator, OEM, or user.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of adaptive cell selection, reselection and mobility assistance techniques as described herein, or the processor 1040 and the memory 1030 may be otherwise configured to perform or support such operations.

FIG. 11 shows a flowchart illustrating a method 1100 that supports adaptive cell selection, reselection and mobility assistance techniques in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving a set of cell preference criteria for ordering a set of cells that are available in a cell selection procedure. The operations of 1105 may be performed in accordance with examples as disclosed herein. In some examples, aspects of the operations of 1105 may be performed by an FPL manager 925 as described with reference to FIG. 9.

At 1110, the method may include identifying two or more cells available for inclusion in the set of cells based on one or more signal measurements of each of the two or more cells. The operations of 1110 may be performed in accordance with examples as disclosed herein. In some examples, aspects of the operations of 1110 may be performed by a cell measurement manager 930 as described with reference to FIG. 9.

At 1115, the method may include ordering a first cell of the two or more cells ahead of a second cell of the two or more cells based on the set of cell preference criteria and one or more associated features or cell types of each of the first cell and the second cell. The operations of 1115 may be performed in accordance with examples as disclosed herein. In some examples, aspects of the operations of 1115 may be performed by an ordering manager 935 as described with reference to FIG. 9.

At 1120, the method may include transmitting a message to the first cell based on the ordering. The operations of 1120 may be performed in accordance with examples as disclosed herein. In some examples, aspects of the operations of 1120 may be performed by an uplink communication manager 940 as described with reference to FIG. 9.

FIG. 12 shows a flowchart illustrating a method 1200 that supports adaptive cell selection, reselection and mobility assistance techniques in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving a set of cell preference criteria for ordering a set of cells that are available in a cell selection procedure. The operations of 1205 may be performed in accordance with examples as disclosed herein. In some examples, aspects of the operations of 1205 may be performed by an FPL manager 925 as described with reference to FIG. 9.

At 1210, the method may include identifying two or more cells available for inclusion in the set of cells based on one or more signal measurements of each of the two or more cells. The operations of 1210 may be performed in accordance with examples as disclosed herein. In some examples, aspects of the operations of 1210 may be performed by a cell measurement manager 930 as described with reference to FIG. 9.

At 1215, the method may include ordering a first cell of the two or more cells ahead of a second cell of the two or more cells based on the set of cell preference criteria and one or more associated features or cell types of each of the first cell and the second cell. The operations of 1215 may be performed in accordance with examples as disclosed herein. In some examples, aspects of the operations of 1215 may be performed by an ordering manager 935 as described with reference to FIG. 9.

At 1220, the method may include transmitting a message to the first cell based on the ordering. The operations of 1220 may be performed in accordance with examples as disclosed herein. In some examples, aspects of the operations of 1220 may be performed by an uplink communication manager 940 as described with reference to FIG. 9.

At 1225, the method may include receiving an updated set of cell preference criteria for ordering the set of cells. The operations of 1225 may be performed in accordance with examples as disclosed herein. In some examples, aspects of the operations of 1225 may be performed by an FPL manager 925 as described with reference to FIG. 9.

At 1230, the method may include reordering the two or more cells of the set of cells based on the updated set of cell preference criteria. The operations of 1230 may be performed in accordance with examples as disclosed herein. In some examples, aspects of the operations of 1230 may be performed by an ordering manager 935 as described with reference to FIG. 9.

FIG. 13 shows a flowchart illustrating a method 1300 that supports adaptive cell selection, reselection and mobility assistance techniques in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving a set of cell preference criteria for ordering a set of cells that are available in a cell selection procedure. The operations of 1305 may be performed in accordance with examples as disclosed herein. In some examples, aspects of the operations of 1305 may be performed by an FPL manager 925 as described with reference to FIG. 9.

At 1310, the method may include identifying two or more cells available for inclusion in the set of cells based on one or more signal measurements of each of the two or more cells. The operations of 1310 may be performed in accordance with examples as disclosed herein. In some examples, aspects of the operations of 1310 may be performed by a cell measurement manager 930 as described with reference to FIG. 9.

At 1315, the method may include maintaining a feature cell database that includes a cell identity and a feature mask for each of the two or more cells of the set of cells, where the feature mask indicates supported features and the ordering is based on the feature mask and the set of cell preference criteria. The operations of 1315 may be performed in accordance with examples as disclosed herein. In some examples, aspects of the operations of 1315 may be performed by an FDB manager 950 as described with reference to FIG. 9.

At 1320, the method may include ordering a first cell of the two or more cells ahead of a second cell of the two or more cells based on the set of cell preference criteria and one or more associated features or cell types of each of the first cell and the second cell. The operations of 1320 may be performed in accordance with examples as disclosed herein. In some examples, aspects of the operations of 1320 may be performed by an ordering manager 935 as described with reference to FIG. 9.

At 1325, the method may include transmitting a message to the first cell based on the ordering. The operations of 1325 may be performed in accordance with examples as disclosed herein. In some examples, aspects of the operations of 1325 may be performed by an uplink communication manager 940 as described with reference to FIG. 9.

FIG. 14 shows a flowchart illustrating a method 1400 that supports adaptive cell selection, reselection and mobility assistance techniques in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving a set of cell preference criteria for ordering a set of cells that are available in a cell selection procedure. The operations of 1405 may be performed in accordance with examples as disclosed herein. In some examples, aspects of the operations of 1405 may be performed by an FPL manager 925 as described with reference to FIG. 9.

At 1410, the method may include identifying two or more cells available for inclusion in the set of cells based on one or more signal measurements of each of the two or more cells. The operations of 1410 may be performed in accordance with examples as disclosed herein. In some examples, aspects of the operations of 1410 may be performed by a cell measurement manager 930 as described with reference to FIG. 9.

At 1415, the method may include maintaining a feature cell database that includes a cell identity and a feature mask for each of the two or more cells of the set of cells, where the feature mask indicates supported features and the ordering is based on the feature mask and the set of cell preference criteria. The operations of 1415 may be performed in accordance with examples as disclosed herein. In some examples, aspects of the operations of 1415 may be performed by an FDB manager 950 as described with reference to FIG. 9.

At 1420, the method may include ordering a first cell of the two or more cells ahead of a second cell of the two or more cells based on the set of cell preference criteria and one or more associated features or cell types of each of the first cell and the second cell. The operations of 1420 may be performed in accordance with examples as disclosed herein. In some examples, aspects of the operations of 1420 may be performed by an ordering manager 935 as described with reference to FIG. 9.

At 1425, the method may include adaptively ranking the two or more cells based at least in part in the set of cell preference criteria and the feature cell database for one or more of a power-on cell selection procedure, an out-of-service (OOS) cell reselection procedure, a radio link failure recovery procedure, or any combinations thereof. The operations of 1425 may be performed in accordance with examples as disclosed herein. In some examples, aspects of the operations of 1425 may be performed by an ordering manager 935 as described with reference to FIG. 9.

At 1430, the method may include transmitting a message to the first cell based on the ordering. The operations of 1430 may be performed in accordance with examples as disclosed herein. In some examples, aspects of the operations of 1430 may be performed by an uplink communication manager 940 as described with reference to FIG. 9.

FIG. 15 shows a flowchart illustrating a method 1500 that supports adaptive cell selection, reselection and mobility assistance techniques in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving a set of cell preference criteria for ordering a set of cells that are available in a cell selection procedure. The operations of 1505 may be performed in accordance with examples as disclosed herein. In some examples, aspects of the operations of 1505 may be performed by an FPL manager 925 as described with reference to FIG. 9.

At 1510, the method may include identifying two or more cells available for inclusion in the set of cells based on one or more signal measurements of each of the two or more cells. The operations of 1510 may be performed in accordance with examples as disclosed herein. In some examples, aspects of the operations of 1510 may be performed by a cell measurement manager 930 as described with reference to FIG. 9.

At 1515, the method may include ordering a first cell of the two or more cells ahead of a second cell of the two or more cells based on the set of cell preference criteria and one or more associated features or cell types of each of the first cell and the second cell. The operations of 1515 may be performed in accordance with examples as disclosed herein. In some examples, aspects of the operations of 1515 may be performed by an ordering manager 935 as described with reference to FIG. 9.

At 1520, the method may include biasing, based on the set of cell preference criteria, a measurement report that is transmitted to a serving cell to indicate one or more preferred cells that meet measurement reporting criteria. The operations of 1520 may be performed in accordance with examples as disclosed herein. In some examples, aspects of the operations of 1520 may be performed by a cell measurement manager 930 as described with reference to FIG. 9.

At 1525, the method may include transmitting the measurement report to the first cell based on the ordering and the biasing. The operations of 1525 may be performed in accordance with examples as disclosed herein. In some examples, aspects of the operations of 1525 may be performed by an uplink communication manager 940 as described with reference to FIG. 9.

The following provides an overview of aspects of the present disclosure:

Aspect 1: A method for wireless communication at a UE, comprising: receiving a set of cell preference criteria for ordering a set of cells that are available in a cell selection procedure; identifying two or more cells available for inclusion in the set of cells based at least in part on one or more signal measurements of each of the two or more cells; ordering a first cell of the two or more cells ahead of a second cell of the two or more cells based at least in part on the set of cell preference criteria and one or more associated features or cell types of each of the first cell and the second cell; and transmitting a message to the first cell based at least in part on the ordering.

Aspect 2: The method of aspect 1, further comprising: receiving an updated set of cell preference criteria for ordering the set of cells; reordering the two or more cells of the set of cells based at least in part on the updated set of cell preference criteria.

Aspect 3: The method of any of aspects 1 through 2, wherein the set of cell preference criteria is based at least in part on a priority list of one or more features or cell types associated with the set of cells.

Aspect 4: The method of aspect 3, wherein the one or more features or cell types include one or more of an enhanced measurement report feature, a throughput capability, a power level, a closed subscriber group cell type, an enhanced multimedia broadcast and multicast service cell type, a cellular vehicle-to-everything cell type, a high speed train cell type, a non-standalone (NSA) cell type, an enhanced coverage level feature, or any combinations thereof.

Aspect 5: The method of aspect 4, wherein the set of cell preference criteria is based on one or more of a carrier preference, an original equipment manufacturer (OEM) preference, a user preference, or any combinations thereof.

Aspect 6: The method of any of aspects 1 through 5, wherein the set of cell preference criteria, and one or more updated sets of cell preference criteria are received through over-the-air (OTA) wireless modem upgrades received at the UE, a user preference change received at the UE, or any combinations thereof.

Aspect 7: The method of aspect 6, wherein the set of cell preference criteria is extensible for any new feature or cell type that is defined subsequent to an initial deployment of the UE.

Aspect 8: The method of any of aspects 1 through 7, wherein the set of cell preference criteria is based at least in part on a subscription associated with the UE and is applied across two or more radio access technologies (RATs).

Aspect 9: The method of any of aspects 1 through 8, further comprising: maintaining a feature cell database that includes a cell identity and a feature mask for each of the two or more cells of the set of cells, wherein the feature mask indicates supported features and the ordering is based at least in part on the feature mask and the set of cell preference criteria.

Aspect 10: The method of aspect 9, wherein the supported features of each cell are determined based at least in part on one or more system information blocks received from each cell.

Aspect 11: The method of aspect 10, wherein the feature cell database is accumulated over time by the UE, updated by an original equipment manufacturer (OEM) through a wireless modem interface, updated by a carrier associated with the UE through the wireless modem interface, or any combinations thereof.

Aspect 12: The method of any of aspects 9 through 11, wherein the feature cell database includes separate entries for two or more radio access technologies (RATs), one or more entries that are applied across the two or more RATs, or combinations thereof.

Aspect 13: The method of any of aspects 9 through 12, wherein the ordering comprises: adaptively ranking the two or more cells based at least in part in the set of cell preference criteria and the feature cell database for one or more of a power-on cell selection procedure, an out-of-service (OOS) cell reselection procedure, a radio link failure recovery procedure, or any combinations thereof.

Aspect 14: The method of any of aspects 9 through 13, wherein the ordering provides that a more preferred cell is prioritized for selection by the UE based at least in part in the set of cell preference criteria and the feature cell database.

Aspect 15: The method of any of aspects 1 through 14, wherein a cell reselection procedure is biased to a preferred cell through ordering an absolute radio frequency channel number or frequency layer of the preferred cell ahead of one or more other absolute radio frequency channel numbers or frequency layers of one or more other cells.

Aspect 16: The method of any of aspects 1 through 15, further comprising: biasing, based at least in part on the set of cell preference criteria, a measurement report that is transmitted to a serving cell to indicate one or more preferred cells that meet measurement reporting criteria.

Aspect 17: The method of any of aspects 1 through 16, wherein the set of cell preference criteria and a feature cell database are shared by two or more supported radio access technologies (RATs) to bias inter-RAT mobility toward one or more preferred cells across the two or more supported RATs.

Aspect 18: The method of aspect 17, wherein the UE switches from a first RAT to a second RAT of the two or more supported RATs, and wherein the feature cell database is used to select a return cell of the first RAT when the UE switches back to the first RAT from the second RAT.

Aspect 19: The method of any of aspects 1 through 18, wherein the set of cell preference criteria and a feature cell database is applied to any RAT over which the UE can communicate with another wireless device, irrespective of whether the RAT is defined before or after deployment of the UE.

Aspect 20: An apparatus for wireless communication at a UE, comprising a processor; memory coupled with the processor; and instructions stored in the memory and executable by the processor to cause the apparatus to perform a method of any of aspects 1 through 19.

Aspect 21: An apparatus for wireless communication at a UE, comprising at least one means for performing a method of any of aspects 1 through 19.

Aspect 22: A non-transitory computer-readable medium storing code for wireless communication at a UE, the code comprising instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving a set of cell preference criteria for ordering a set of cells that are available in a cell selection procedure;

identifying two or more cells available for inclusion in the set of cells based at least in part on one or more signal measurements of each of the two or more cells;

ordering a first cell of the two or more cells ahead of a second cell of the two or more cells based at least in part on the set of cell preference criteria and one or more associated features or cell types of each of the first cell and the second cell; and transmitting a message to the first cell based at least in part on the ordering ;

wherein the set of cell preference criteria and a feature cell database are shared by two or more supported radio access technologies (RATs) to bias inter-RAT mobility toward one or more preferred cells across the two or more supported RATs; and wherein the UE switches from a first RAT to a second RAT of the two or more supported RATs, and wherein the feature cell database is used to select a return cell of the first RAT when the UE switches back to the first RAT from the second RAT.

2. The method of claim 1, further comprising:

receiving an updated set of cell preference criteria for ordering the set of cells;

reordering the two or more cells of the set of cells based at least in part on the updated set of cell preference criteria.

3. The method of claim 1, wherein the set of cell preference criteria is based at least in part on a priority list of one or more features, one or more cell types, or a combination thereof associated with the set of cells.

4. The method of claim 3, wherein the one or more features er cell types include one or more of an enhanced measurement report feature, a throughput capability, a power level, an enhanced coverage level feature, and the one or more cell types include one or more of a closed subscriber group cell type, an enhanced multimedia broadcast and multicast service cell type, a cellular vehicle-to-everything cell type, a high speed train cell type, a non-standalone (NSA) cell type, or any combinations thereof.

5. The method of claim 4, wherein the set of cell preference criteria is based on one or more of a carrier preference, an original equipment manufacturer (OEM) preference, a user preference, or any combinations thereof.

6. The method of claim 1, wherein the set of cell preference criteria, and one or more updated sets of cell preference criteria are received through over-the-air (OTA) wireless modem upgrades received at the UE, a user preference change received at the UE, or any combinations thereof.

7. The method of claim 6, wherein the set of cell preference criteria is extensible for any new feature or cell type that is defined subsequent to an initial deployment of the UE.

8. The method of claim 1, wherein the set of cell preference criteria is based at least in part on a subscription associated with the UE and is applied across two or more radio access technologies (RATs).

9. The method of claim 1, further comprising:
maintaining the feature cell database that includes-a cell identity and a feature mask for each of the two or more cells of the set of cells, wherein the feature mask indicates supported features and the ordering is based at least in part on the feature mask and the set of cell preference criteria.

10. The method of claim 9, wherein the supported features of each cell are determined based at least in part on one or more system information blocks received from each cell.

11. The method of claim 10, wherein the feature cell database is accumulated over time by the UE, updated by an original equipment manufacturer (OEM) through a wireless modem interface, updated by a carrier associated with the UE through the wireless modem interface, or any combinations thereof.

12. The method of claim 9, wherein the feature cell database includes separate entries for two or more radio access technologies (RATs), one or more entries that are applied across the two or more RATs, or combinations thereof.

13. The method of claim 9, wherein the ordering comprises:
adaptively ranking the two or more cells based at least in part in the set of cell preference criteria and the feature cell database for one or more of a power-on cell selection procedure, an out-of-service (OOS) cell reselection procedure, a radio link failure recovery procedure, or any combinations thereof.

14. The method of claim 9, wherein the ordering provides that a more preferred cell is prioritized for selection by the UE based at least in part in the set of cell preference criteria and the feature cell database.

15. The method of claim 1, wherein a cell reselection procedure is biased to a preferred cell through ordering an absolute radio frequency channel number or frequency layer of the preferred cell ahead of one or more other absolute radio frequency channel numbers or frequency layers of one or more other cells.

16. The method of claim 1, further comprising:
biasing, based at least in part on the set of cell preference criteria, a measurement report that is transmitted to a serving cell to indicate one or more preferred cells that meet measurement reporting criteria.

17. The method of claim 1, wherein the set of cell preference criteria and the feature cell database is applied to any radio access technology (RAT) over which the UE can communicate with another wireless device, irrespective of whether the RAT is defined before or after deployment of the UE.

18. A user equipment (UE), comprising:
one or more processors;
memory coupled with the one or more processors; and
instructions stored in the memory and executable by the one or more processors to cause the apparatus to:
receive a set of cell preference criteria for ordering a set of cells that are available in a cell selection procedure;
identify two or more cells available for inclusion in the set of cells based at least in part on one or more signal measurements of each of the two or more cells;
order a first cell of the two or more cells ahead of a second cell of the two or more cells based at least in part on the set of cell preference criteria and one or more associated features or cell types of each of the first cell and the second cell; and
transmit a message to the first cell based at least in part on the ordering;
wherein the set of cell preference criteria and a feature cell database are shared by two or more supported radio access technologies (RATs) to bias inter-RAT mobility toward one or more preferred cells across the two or more supported RATs; and
wherein the UE switches from a first RAT to a second RAT of the two or more supported RATs, and wherein the feature cell database is used to select a return cell of the first RAT when the UE switches back to the first RAT from the second RAT.

19. The UE of claim 18, wherein the instructions are further executable by the processor to cause the apparatus to:
receive an updated set of cell preference criteria for ordering the set of cells;
reorder the two or more cells of the set of cells based at least in part on the updated set of cell preference criteria.

20. The UE of claim 18, wherein the set of cell preference criteria is based at least in part on a priority list of one or more features, one or more cell types, or a combination thereof associated with the set of cells.

21. The UE of claim 20, wherein the one or more features include one or more of an enhanced measurement report feature, a throughput capability, a power level, an enhanced coverage level feature, and the one or more cell types include one or more of a closed subscriber group cell type, an enhanced multimedia broadcast and multicast service cell type, a cellular vehicle-to-everything cell type, a high speed train cell type, a non-standalone (NSA) cell type, or any combinations thereof.

22. The UE of claim 18, wherein the instructions are further executable by the processor to cause the apparatus to:
maintain the feature cell database that includes a cell identity and a feature mask for each of the two or more cells of the set of cells, wherein the feature mask indicates supported features and the ordering is based at least in part on the feature mask and the set of cell preference criteria.

23. A user equipment (UE), comprising:
means for receiving a set of cell preference criteria for ordering a set of cells that are available in a cell selection procedure;

means for identifying two or more cells available for inclusion in the set of cells based at least in part on one or more signal measurements of each of the two or more cells;

means for ordering a first cell of the two or more cells ahead of a second cell of the two or more cells based at least in part on the set of cell preference criteria and one or more associated features or cell types of each of the first cell and the second cell; and means for transmitting a message to the first cell based at least in part on the ordering;

wherein the set of cell preference criteria and a feature cell database are shared by two or more supported radio access technologies (RATs) to bias inter-RAT mobility toward one or more preferred cells across the two or more supported RATs; and wherein the UE switches from a first RAT to a second RAT of the two or more supported RATs, and wherein the feature cell database is used to select a return cell of the first RAT when the UE switches back to the first RAT from the second RAT.

24. The UE of claim 23, further comprising:

means for receiving an updated set of cell preference criteria for ordering the set of cells; and means for reordering the two or more cells of the set of cells based at least in part on the updated set of cell preference criteria.

25. The UE of claim 23, wherein:

the set of cell preference criteria is based at least in part on a priority list of one or more features or cell types associated with the set of cells.

26. A non-transitory computer-readable medium storing code for wireless communication at a user equipment (UE), the code comprising instructions executable by a processor to:

receive a set of cell preference criteria for ordering a set of cells that are available in a cell selection procedure;

identify two or more cells available for inclusion in the set of cells based at least in part on one or more signal measurements of each of the two or more cells;

order a first cell of the two or more cells ahead of a second cell of the two or more cells based at least in part on the set of cell preference criteria and one or more associated features or cell types of each of the first cell and the second cell; and transmit a message to the first cell based at least in part on the ordering;

wherein the set of cell preference criteria and a feature cell database are shared by two or more supported radio access technologies (RATs) to bias inter-RAT mobility toward one or more preferred cells across the two or more supported RATs; and wherein the UE switches from a first RAT to a second RAT of the two or more supported RATs, and wherein the feature cell database is used to select a return cell of the first RAT when the UE switches back to the first RAT from the second RAT.

27. The non-transitory computer-readable medium of claim 26, wherein the instructions are further executable by the processor to:

receive an updated set of cell preference criteria for ordering the set of cells;

reorder the two or more cells of the set of cells based at least in part on the updated set of cell preference criteria.

28. The non-transitory computer-readable medium of claim 26, wherein the set of cell preference criteria is based at least in part on a priority list of one or more features or cell types associated with the set of cells.

* * * * *